INVENTOR
JACK D. ZEFF
BY
ATTORNEYS.

Dec. 30, 1969 J. D. ZEFF 3,487,016
METHOD OF PURIFYING WASTE WATER BY CATALYTIC OXIDATION
Filed July 14, 1967 2 Sheets-Sheet 2

INVENTOR
JACK D. ZEFF
BY
Hubbell Cohen Stiefel
ATTORNEYS.

United States Patent Office 3,487,016
Patented Dec. 30, 1969

3,487,016
METHOD OF PURIFYING WASTE WATER BY CATALYTIC OXIDATION
Jack D. Zeff, Livingston, N.J., assignor to Arde, Inc., Paramus, N.J., a corporation of Delaware
Filed July 14, 1967, Ser. No. 653,556
Int. Cl. C02c 5/04
U.S. Cl. 210—18                         10 Claims

ABSTRACT OF THE DISCLOSURE

Catalytic oxidation of organic and inorganic materials in liquid or vapor phase using oxygen-containing gas and catalyst comprising acid treated $MnO_2$. Acid treatment may be with inorganic or organic acid solutions or with solutions of acid salts, i.e., salts which hydrolize to acid pH. Particularly applicable to oxidation of organics present in dilute solutions, especially to purifying waste water containing organic pollutants therein by catalytic oxidation of organic solutions. $PbO_2$ may also be used as catalyst for such oxidation of pollutants in dilute solution.

BACKGROUND OF THE INVENTION

Field of the invention

This invention relates to the catalytic oxidation of organic and inorganic materials. In one embodiment, the invention relates to the catalytic oxidation of organic materials present in dilute aqueous solutions. In another aspect, the invention is applicable to the oxidation of oxidizable inorganic materials, such as ammonia. In a preferred embodiment, the invention is employed in a process for purifying waste water containing organic pollutants derived from human and/or industrial wastes, more particularly, to the catalytic oxidation of organic pollutants in the waste water.

While the invention is applicable to any reaction involving catalytic oxidation of oxidizable organic and inorganic materials, it will be discussed herein primarily with regard to oxidation of organic and inorganic materials which are in dilute aqueous solution and, more particularly, as applicable to such problems as the treatment of domestic and industrial sewage before discharge thereof into streams and rivers and the treatment of contaminated water in order to render it sufficiently pure for reuse. In one embodiment thereof, the invention may be employed to purify human urine for reuse as potable water on long space voyages and the like. Accordingly, as used herein, "waste water" will be understood to include urine and other aqueous materials containing oxidizable contaminants.

Description of the prior art

With increasing population and increasing industrial concentration, problems of treatment of waste water have been mounted in urgency. Thus, the problems of water pollution caused by industrial and domestic wastes are becoming increasingly acute. In addition, ever increasing population density makes it essential to find efficient and economically feasible methods of reusing water. A prime source of water pollution, and a difficult type of pollutant to remove, is organic waste material. There have been a number of prior proposals to remove organic waste material from waste water by a variety of processes including oxidation thereof.

Convenient measurements of oxidizable organic waste in polluted water are C.O.D. (chemical oxygen demand) and T.O.C. (total organic carbon). As the organic material is oxidized, the C.O.D., which is a measure of the amount of oxygen which can further be taken up by the organic pollutants, decreases. If there is oxidation to carbon dioxide and water, then the T.O.C. likewise decreases.

Previous proposals for reducing the C.O.D. and the T.O.C. of waste water, including industrial waste, include catalytic oxidation using a number of catalysts, including metal and metal oxide catalysts. For example, U.S. Patent 2,690,425, issued Sept. 28, 1954, proposes the use of manganese oxide, mixtures of manganese and silver oxides, and such mixtures of metals as manganese-zinc-chromium. Such process requires the use of relatively high temperatures, for example between 300 and 350° C., and high pressures, for example pressures between 200 and 2400 pounds per square inch. Another prior proposal, in U.S. Patent 3,054,653, issued Sept. 18, 1962, employs as the catalyst a mixture of silver oxide and manganese dioxide under temperature conditions of the order of 150 to 375° C. and pressures of the order of 100 to 6000 pounds per square inch. Due to the high costs involved in establishing and maintaining these high temperatures and pressures, such processes have not been employed commercially to any significant degree. It has also been proposed in U.S. Patent 2,132,592, issued Oct. 11, 1938, to use manganese dioxide as the source of oxygen to oxidize waste water organics, but such process is relatively expensive in that the manganese dioxide employed is consumed.

SUMMARY OF THE INVENTION

I have now found that a particular type of $MnO_2$ catalyst is particularly effective for oxidizing organic and inorganic materials. Thus, in one particular embodiment of the invention, both the C.O.D. and T.O.C. of waste water can be markedly reduced by catalytic oxidation under considerably milder, and therefore more economical, conditions than have been employed heretofore by contacting the waste water with an oxygen-containing gas as a source of oxygen and with this particular $MnO_2$ oxidation catalyst. More particularly, I have found that when manganese dioxide is prepared by precipitation from an acid solution, such as one containing an excess of $Mn(NO_3)_2$, or when a typical $MnO_2$ material, such as electrolytic grade $MnO_2$, which has not been previously subjected to acid treatment, is subjected to an acid treatment, using, for example, a relatively strong acid or a salt of a relatively strong acid and a weak base, then such material may be employed as a catalyst for the oxidation of organic materials, for example, organic contaminants in waste water, either in the liquid or vapor phase, under relatively mild conditions. Moreover, the invention has been found to be applicable to the oxidation of aqueous inorganic materials, such as aqueous ammonia. Accordingly, the invention is broadly applicable to the catalytic oxidation, in the liquid or gaseous phase, of any oxidizable organic or inorganic material. I have also found that $PbO_2$ may also be employed as the catalyst for such purification of contaminated water.

DESCRIPTION OF THE PREFERRED EMBODIMENTS

Figure 1:
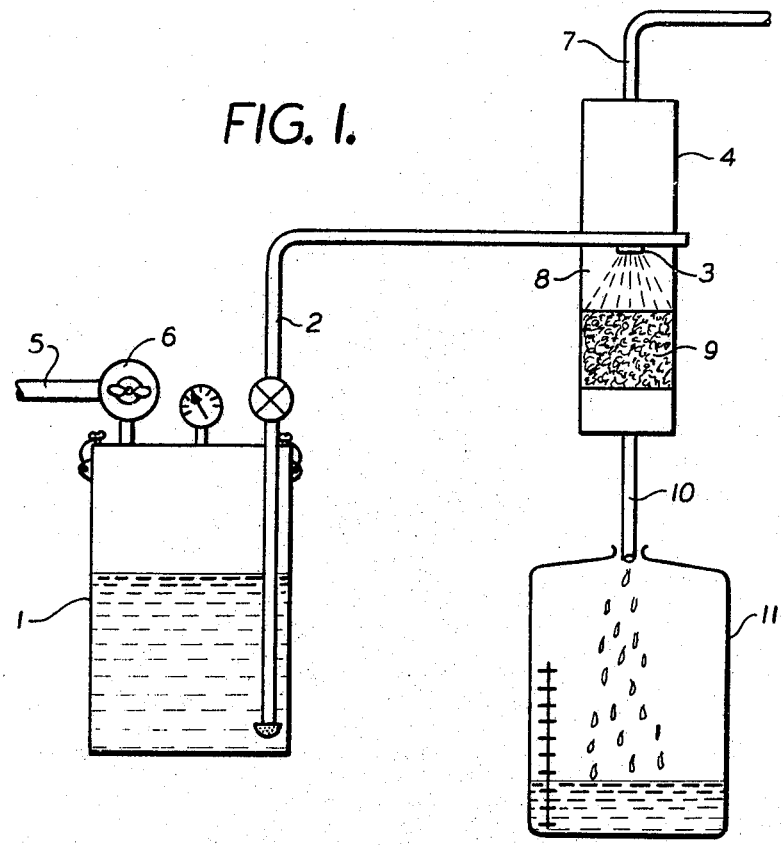
FIG. 1 is a schematic diagram of a spray reaction system which may be employed to perform the process of the present invention.

I have found that good reductions in C.O.D. are obtained with the catalysts of the present invention by operating, in the vapor phase, at temperatures of from about 32° F. up to below the temperature at which decomposition of the catalyst occurs, preferably 90 to 350° F., and more preferably at temperatures of from about 100 to 300° F. For reasons of economy of operation, it is preferred to employ atmospheric pressure or less, although superatmospheric pressures could be employed, if desired. In the liquid phase, any temperatures between the freezing and boiling points of the waste, preferably between about 40° F. and about 90° F. may be employed, desirably at atmospheric pressure.

By contrast, when a commercial $MnO_2$ material is employed under the same conditions, but without a previous acid treatment, no significant reduction in C.O.D. is observed. However, after an acid treatment in accordance with the present invention, using, for example, $H_2SO_4$ or $HNO_3$, the commercial $MnO_2$ material may then be employed as a catalyst under the conditions of the present invention to afford excellent reductions in C.O.D.

The precise reason why the acid treatment is needed is not known, but it is postulated that what is involved is removal of lower oxides from the surface of the $MnO_2$ by the acid treatment. That is, $Mn_3O_4$, $MnOOH$, etc., on the surface of untreated $MnO_2$, are believed to be converted by a disproportionation reaction to $MnO_2$ and $MnO$. The $MnO$ dissolves and is removed from the $MnO_2$ by washing, leaving what is believed to be a pure $MnO_2$ surface.

In addition, the presence of entrained $H^+$ or $H_3O^+$ on the surface of the catalyst is believed to be important. Thus, it has been found that when treating certain natural effluent, e.g., raw sewage, the catalyst sometimes tends to become deactivated after an extended period of use. Moreover, contact with alkali, such as an NaOH solution, also deactivates the catalyst. It may, however, be readily reactivated by subjecting it to an acid treatment with a relatively strong acid solution such as, for example, 0.5 N–3 N $H_2SO_4$, 0.5 N–5 N $HNO_3$, 0.1 N phosphoric acid, 1 molar acetic acid, etc. I have also found that electrolytic grade $MnO_2$ can be activated by treatment with excess manganous nitrate. Thus, not only relatively strong acids but also acid salts can be used as activators. The term "acid salt" as used herein is intended to include those salts which hydrolize in water to an acid pH, preferably a pH of less than about 4, more preferably a pH of less than about 3, more preferably, less than about 2.

The $MnO_2$ or $PbO_2$ catalyst may be used unsupported in the powder state or may be supported on a substrate such as alumina. Thus, the $MnO_2$ may, for example, be precipitated on a preformed activated alumina substrate. It has been determined that the alumina substrate does not cause oxidation of the organic material in the waste water under the conditions of the present invention in the absence of the deposited catalyst of the present invention.

As previously mentioned, the $MnO_2$ catalyst may be prepared by precipitation from an acidic solution, if desired on an activated alumina base. In a typical preparation of a $MnO_2$ catalyst, $Mn(NO_3)_2$ is reacted with $NaBrO_3$, preferably in the presence of a minor amount of oxalic acid for pH control. Other oxidants which may be used in place of the $NaBr_3$ include $NaClO_3$, $(NH_4)_2S_2O_8$, and the like. Of course, other reactions may be employed to precipitate the $MnO_2$. However, if it is not precipitated in an acidic medium then it must be activated with an acid treatment as described herein for the commercially available $MnO_2$.

I have found that many different techniques may be used in carrying out the catalytic oxidation of waste water in accordance with the present invention. In the liquid phase, these techniques include simply stirring the waste water in contact with the catalyst as with a magnetic stirrer, while bubbling in oxygen containing gas therethrough. Generally, ambient pressure and temperature are employed. Other successful liquid phase techniques include the use of a high speed mixer, such as a Waring Blendor, a spray reactor, as in the spray reaction system depicted in FIG. 1 and an atomizing reaction system such as that depicted in FIG. 2.

In the vapor phase, a packed bed reactor may be used, preferably at temperatures between 100 and 300° F. and at pressures not greater than atmospheric. Suitable techniques include a low-pressure distillation system, such as that illustrated in FIG. 3, and an air evaporation distillation system, such as that illustrated in FIG. 4.

Considering the drawings in detail, FIG. 1 schematically illustrates a spray reaction system which may be employed to effect liquid phase catalytic oxidation of waste water in accordance with the present invention. As shown in the drawing, waste water from tank 1 is forced through conduit 2 into spray head 3 in the spray reactor 4 by compressed air, which is supplied from conduit 5 through control valve 6. Oxygen is fed to the spray reactor 4 through a conduit 7 and is mixed with the effluent spray in section 8 of the reactor 4. The intimately admixed oxygen-containing gas and waste water pass through catalytic bed 9 in reactor 4 and treated effluent is then conducted through conduit 10 to storage tank 11.

Figure 2:
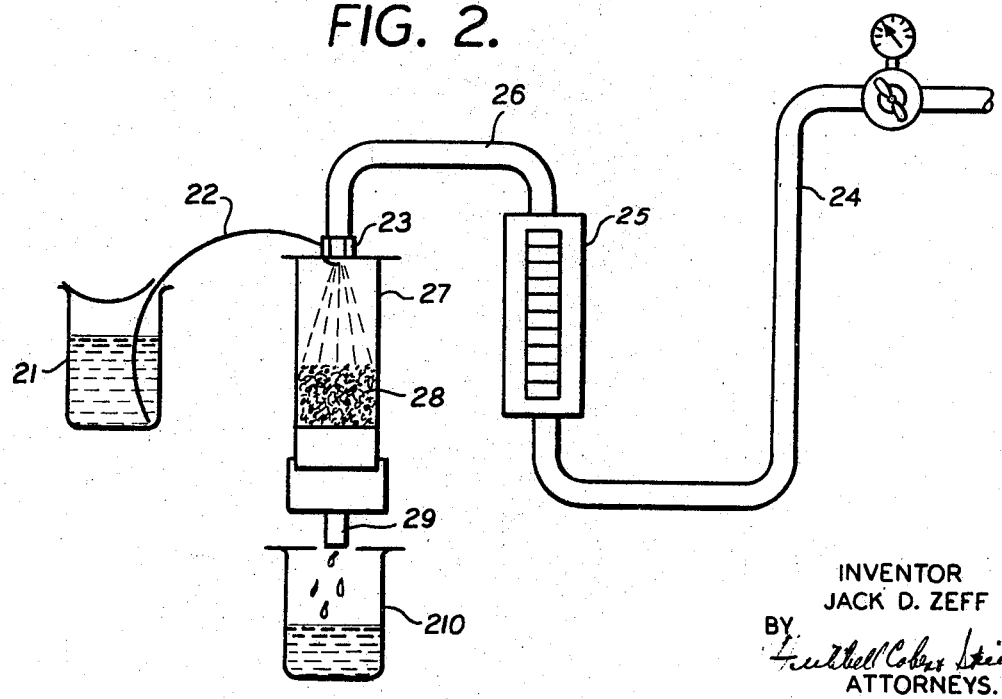
FIG. 2 is a schematic diagram of an atomizing reaction system which may be employed to perform the process of the present invention.

FIG. 2 is a schematic diagram of atomizing apparatus which may be employed for the liquid phase catalytic oxidation of waste water. In this reaction system, waste water from tank 21 is fed through conduit 22 to the atomizer head 23. An oxygen containing gas is fed under pressure through conduit 24, rotameter 25 and conduit 26 into the atomizing head 23. The waste water is atomized by and intimately admixed with the oxygen-containing gas in the atomizing head. The atomized mist then passes into the reaction chamber 27 and through the catalytic bed 28. Processed effluent is conducted through conduit 29 into storage tank 210.

Figure 3:
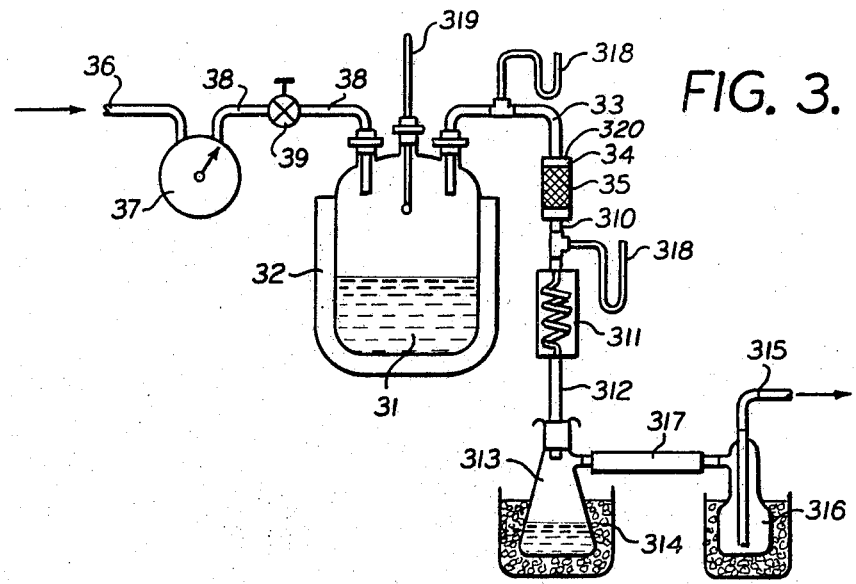
FIG. 3 is a schematic diagram of a low pressure distillation system which may be employed to perform the process of the present invention.

FIG. 3 is a schematic diagram of low-pressure distillation apparatus which may be employed for the vapor phase catalytic oxidation of waste water in accordance with the present invention. As shown in the drawing, waste water in evaporator 31, which is provided with a heating mantle 32 and a thermometer 319, is distilled under low pressure and passed, admixed with oxygen, through conduit 33 into reactor 34 containing catalytic bed 35. The oxygen-containing gas, e.g., air, is introduced through inlet 36, wet test meter 37 and conduit 38 into the evaporator 31, wherein the oxygen-containing gas and the waste water vapor are admixed. The flow of the oxygen-containing gas through conduit 38 is controlled by needle valve 39.

From the reactor 34, the vapor is conducted through line 310 into a condenser 311 wherein the treated water is condensed. The condensate passes through conduit 312 into collection vessel 313 which is provided with a cooling bath 314.

The reduced pressure is maintained by a vacuum pump (not shown) which is connected to the system through line 315, liquid nitrogen trap 316 and conduit 317, which conduit communicates with the upper portion of collection vessel 313. The pressure in the system is measured by absolute manometers 318. The temperature in the catalytic bed 35 is measured by means of a thermocouple 320.

Figure 4:
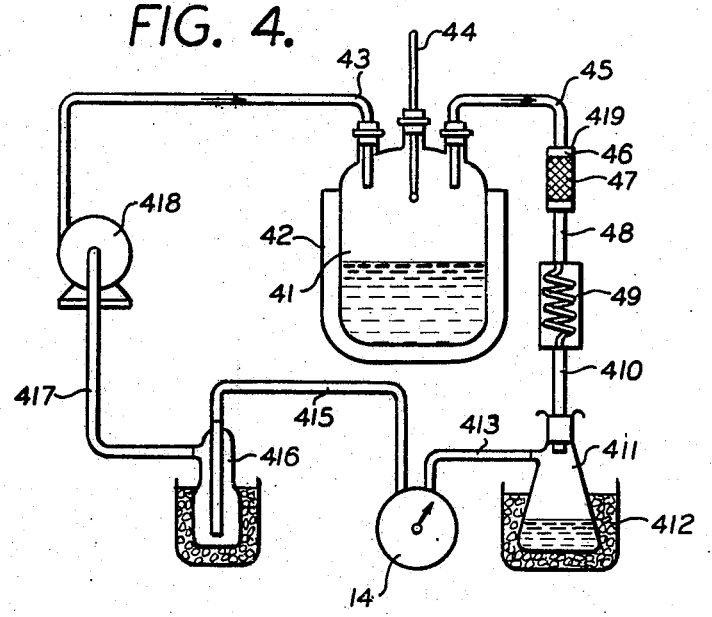
FIG. 4 is a schematic diagram of an air evaporation distillation system which may be employed to perform the process of the present invention.

FIG. 4 is a schematic diagram of air evaporation distillation apparatus which may be employed for the vapor phase catalytic oxidation of waste water in accordance with the present invention. In the illustration of FIG. 4, waste water in evaporator 41 is evaporated by means of heat provided by a heating mantle 42 and admixed in the upper portion of the evaporator 41 with air introduced into the evaporator 41 through conduit 43. The temperature in the evaporator 41 is measured by a thermometer 44. The admixed air and waste vapor air conducted through a conduit 45 into a reactor 46 and through a catalytic bed 47 in the reactor 46. The temperature in the catalytic bed 47 is measured by means of a thermocouple 419.

After passing through the catalytic bed 47, the vapor is conducted through line 48 into condenser 49. The condensate then passes through conduit 410 into collection vessel 411 which is provided with a cooling bath 412. The air is recirculated from the collection vessel 411 to the evaporator 41 through conduit 413, wet test meter 14, conduit 415, moisture trap 416, conduit 417 and conduit 43. Circulation is effected by a diaphragm pump 418 located between lines 43 and 417.

In the reactors of FIGS. 1–4, the catalytic bed consists of the catalyst supported on a suitable base, such as activated alumina having a particle size within the range of from about 8 to 14 mesh.

Many other conventional means for conducting the catalytic oxidation will occur to the skilled art worker. The most important considerations are that intimate contact be achieved between the waste water, the oxygen-containing gas and the catalyst and that the greatest possible operating economy be achieved.

Additionally, there have been some indications that the invention has further advantages in the treatment of waste water in that in a number of instances it will render refractory material non-refractory. That is, when material which is not ordinarily degradable by bacterial action has been exposed to the treatment of the present invention, it is thereby rendered bio-degradable. This suggests that a two-stage process can be employed to provide particularly effective treatment of waste water, the first stage of this process being my catalytic oxidation treatment and the second stage being a treatment with aerobic and/or anaerobic bacteria.

In addition, while the foregoing discussion has been primarily with reference to one particular embodiment of the invention, namely the purification of waste water, it will be obvious to the skilled art worker that the invention is of much broader applicability and that it broadly encompasses the use of acid treated $MnO_2$ as a catalyst for the oxidation of oxidizable organic and inorganic materials. Thus, many of the following examples illustrate the oxidation of a "simulated" waste water in connection with the embodiment of this invention concerning the purification of waster water; however such examples also illustrate the effectiveness of the acid treated $MnO_2$ catalyst for oxidations in general. Thus, many of these examples demonstrate the superior results obtained with this catalyst in the oxidation of a wide variety of organic materials and of inorganic materials such as ammonia.

The following examples are presented to further illustrate the invention without in any way limiting the scope thereof.

EXAMPLE 1

An unsupported $MnO_2$ catalyst was prepared by reacting 100 ml. of a 2-molar $NaBrO_3$ (63 gm.) solution with 800 ml. of a 50% solution of $Mn(NO_3)_2$ (400 gm.) containing 0.5 gm. of oxalic acid under agitation at room temperature under a hood. After stirring for about 3 minutes, the reaction mixture was allowed to stand overnight. Bromine gas was evolved and $MnO_2$ catalyst was precipitated. The precipitate was then filtered, washed free of $Br^-$ and then dried for 4 hours at 105° C.

30 gm. of the thus prepared $MnO_2$ catalyst were added to 300 ml. of synthetic waste water comprising an acetic acid solution having a concentration of 15 microliters ($\mu$l) of glacial acetic acid per liter of water, an initial C.O.D. of 12.8 mg./l. and a pH of 4.2. The solution was then agitated for three minutes with a magnetic stirrer while bubbling oxygen through the solution. The C.O.D. of the thus treated acetic acid solution was reduced to 6.0 mg./l. and pH to 3.6.

EXAMPLE 2

Using 30 gm. of the $MnO_2$ catalyst prepared in Example 1, another 300 ml. sample of the acetic acid solution used in Example 1, having an initial C.O.D. of 12.8 mg./l. and a pH of 4.2, was treated at room temperature for 30 minutes by agitating in contact with the catalyst while bubbling $O_2$ gas therethrough. The C.O.D. was thereby reduced to 2.2 mg./l. The pH of the treated solution was 3.5.

EXAMPLE 3

Example 1 was repeated except that the synthetic waste water used was a 300 ml. phenol solution having a concentration of 9.9 mg./l. and an initial C.O.D. of 23.5. After the three-minute treatment, the C.O.D. was reduced to 10.2 mg./l.

EXAMPLE 4

Example 3 was repeated, except that the treatment was continued for 30 minutes. The C.O.D. of the phenol solution was reduced to 9.8 mg./l.

EXAMPLE 5

A supported $MnO_2$ catalyst was prepared by saturating a support of activated $Al_2O_3$ (Alcon F–1, particle size: 8–14 mesh) with 100 ml. of a 2 molar $NaBrO_3$ solution, adding 0.5 gm. of oxalic acid, and then adding 800 ml. of a 50% solution of $Mn(NO_3)_2$ and proceeding as set forth in Example 1.

350 g. of this supported catalyst were then placed in the atomizing reaction system illustrated in FIG. 2 and used, together with $O_2$, to treat at room temperature a synthetic waste water solution of glycerine, having a concentration of 2.5 ml./5 gal., an initial C.O.D. of 21.5 mg./l. and a pH of 6.5. The C.O.D. of the thus treated glycerine solution was reduced to 7.6 mg./l. and the pH thereof was 3.2.

EXAMPLE 6

The catalyst prepared in Example 5 was used in the spray reactor illustrated in FIG. 1 to treat 19 liters of a tannic acid solution having a concentration of about 0.4 gm./5 gal., a C.O.D. of 17.4 mg./l. and a pH of 5.5, under a blanket of oxygen under sufficient pressure to prevent back-up in the catalyst bed. The catalyst bed was located 1½ inches below the spray nozzle and contained 350 gm. of the supported catalyst. The flow rate of the tannic acid solution through the reactor was about 1.5 gal./hr. The temperature in the catalyst bed was about 55° F. The C.O.D. of the thus treated solution was reduced to 6.6 mg./l. and the pH to 4.9.

EXAMPLE 7

Proceeding as in Example 6, 5 liters of secondary effluent from the sewage plant at Wards Island, N.Y. had already been subjected to an activated sludge sewage were treated in the spray reactor. This secondary effluent treatment with aerobic bacteria. The initial C.O.D. thereof was 49.8 mg./l. and the pH was 6.9. The C.O.D. of the thus treated waste water was reduced to 24.2 mg./l. and the pH to 6.2. In addition, a reduction in odor was noted in the treated sample.

Moreover, a bacteria count was taken on samples of the untreated and treated Wards Island effluent and it was found that the bacteria count was reduced to zero by virtue of the above oxidation treatment.

EXAMPLE 8

Using the catalyst and procedure described in Example 6, a tannic acid solution having a concentration of about 0.4 gm./5 gal. and a C.O.D. of 29.3 mg./l. was run continuously through the spray reactor. The C.O.D. of the thus treated solution was 173 mg./l. and the pH was 4.8.

EXAMPLE 9

Another tannic acid solution having a concentration of about 0.4 gm./5 gal. and an initial C.O.D. of 11.1 mg./l.

EXAMPLE 10 was run through the spray reactor using the catalyst and procedure described in Example 1, 300 ml. of a synthetic waste glycerine solution having a concentration of about 11 µl./l., a C.O.D. of 15.9 and a pH of 6.5 was treated in a Waring Blendor for three minutes under an oxygen atmosphere. The oxygen was supplied by bubbling gas through the solution to establish an oxygen blanket thereover. The temperature was about 75° C. The C.O.D. of the thus treated waste was 7.6 mg./l. and the pH was 3.5.

EXAMPLES 12–32

A number of different synthetic organic waste water solutions were treated in a Waring Blendor under the conditions set forth in Example 11. The results are tabulated in Table 1, wherein the properties of waste water treated in accordance with the present invention are compared with those of another sample run through the same reactor but without the catalyst and with those of the untreated control.

TABLE 1

| Example No. | 12 | | | 13 | | | 14 | | | 15 | | | 16 | | | 17 | | | 18 | | |
|---|---|---|---|---|---|---|---|---|---|---|---|---|---|---|---|---|---|---|---|---|---|
| Organic Pollutant | Acetic Acid | | | Aniline | | | Benzaldehyde | | | butyl mercaptan | | | Ethyl Butyrate | | | Glycerine | | | 2-heptanone | | |
| Concentration of Solution | 15µl./l. | | | 7.8µl./l. | | | 9.4µl./l. | | | 10.6µl./l. | | | 11.5µl./l. | | | 11µl./l. | | | 14.7µl./l. | | |
|  | Cat. | No cat. | Control | Cat. | No cat. | Control | Cat. | No cat. | Control | Cat. | No cat. | Control | Cat. | No cat. | Control | Cat. | No cat. | Control | Cat. | No cat. | Control |
| C.O.D. (mg./l.) | 8.1 | 24.3 | 17.1 | 7.8 | 36.1 | 15.4 | 11.8 | 18.6 | 21.3 | 0.42 | 6.3 | 13.1 | 5.5 | 11.3 | 10.6 | 10.4 | 26.1 | 22.0 | 14.4 | 20.5 | 19.1 |
| Conductivity (µ-mhos) | 230.0 | 24.5 | 23.9 | 157.5 | 14.4 | 2.2 | 79.9 | 15.6 | 2.7 | 158.0 | 4.3 | 2.7 | 216.0 | 5.9 | 4.1 | 210.0 | 5.95 | 3.9 | 220.0 | 6.9 | 3.7 |
| pH | 3.2 | 4.5 | 4.2 | 3.6 | 7.1 | 7.3 | 4.1 | 5.7 | 5.8 | 3.6 | 5.8 | 6.1 | 3.8 | 6.0 | 6.2 | 3.7 | 6.2 | 6.5 | 3.7 | 6.6 | 6.5 |
| T.O.C. (mg./l.) | 4.0 | 10.5 | 7.5 | 5.0 | 10.0 | 8.0 | 6.0 | 7.5 | 7.5 | 2.0 | 5.5 | 3.0 | 3.0 | 3.0 | 5.0 | | | | | | |

| Example No. | 19 | 20 | 21 | 22 | 23 | 24 | 25 |
|---|---|---|---|---|---|---|---|
| Organic Pollutant | Lactic Acid | α-lactose | Phenol | Pyruvic Acid | Dextrose | Glutaric Acid | Glycine |
| Concentration of Solution | 14.7µl./l. | 16.2 mg./l. | 9.9 mg./l. | 13.5 mg./l. | 15.6 mg./l. | 14.8 mg./l. | 13.0 mg./l. |

|  | Cat. | No cat. | Control | Cat. | No cat. | Control | Cat. | No cat. | Control | Cat. | No cat. | Control | Cat. | No cat. | Control | Cat. | No cat. | Control | Cat. | No cat. | Control |
|---|---|---|---|---|---|---|---|---|---|---|---|---|---|---|---|---|---|---|---|---|---|
| C.O.D. (mg./l.) | 11.9 | 21.7 | 17.8 | 4.2 | 11.4 | 11.0 | 13.5 | 45.6 | 84.0 | 5.8 | 8.9 | 7.5 | 11.6 | 28.7 | 18.4 | 6.6 | 18.6 | 14.8 | 4.7 | 13.7 | 10.1 |
| Conductivity (µ-mhos) | 120.0 | 31.0 | 37.0 | 126.0 | 25.5 | 25.5 | 208.5 | 8.2 | 3.0 | 218.0 | 17.0 | 25.0 | 55.0 | 41.0 | 2.45 | 83.3 | 20.0 | 19.5 | 155.0 | 10.8 | 3.2 |
| pH | 2.5 | 4.3 | 4.2 | 3.3 | 6.8 | 5.9 | 3.5 | 8.4 | 8.4 | 3.8 | 4.6 | 4.3 | 3.7 | 5.5 | 6.1 | 3.8 | 4.3 | 4.2 | 3.3 | 5.9 | 6.6 |
| T.O.C. (mg./l.) | 4.5 | 8.5 | 9.0 | 3.9 | 5.9 | | | 8.4 | 8.4 | 2.0 | 5.0 | 4.0 | 3.7 | 5.5 | | | 4.3 | | | | |

| Example No. | 26 | 27 | 28 | 29 | 30 | 31 | 32 |
|---|---|---|---|---|---|---|---|
| Organic Pollutant | Glyoxylic Acid | Indole | d,l-Lysine | d,l-Malic Acid | d,l-Tryptophan | Benzoic Acid | Tannic Acid |
| Concentration of Solution | 23.1 mg./l. | 8.1 mg./l. | 9.1 mg./l. | 19.1 mg./l. | 9.4 mg./l. | 11.2 mg./l. | 15.3 mg./l. |

|  | Cat. | No cat. | Control | Cat. | No cat. | Control | Cat. | No cat. | Control | Cat. | No cat. | Control | Cat. | No cat. | Control | Cat. | No cat. | Control | Cat. | No cat. | Control |
|---|---|---|---|---|---|---|---|---|---|---|---|---|---|---|---|---|---|---|---|---|---|
| C.O.D. (mg./l.) | 5.4 | 10.5 | 10.1 | 7.1 | 23.1 | 22.9 | 2.6 | 15.4 | 10.4 | 2.8 | 13.3 | 15.8 | 1.9 | 18.3 | 16.2 | 22.2 | 32.0 | 71.3 | 10.5 | 21.0 | 21.4 |
| Conductivity (µ-mhos) | 161.0 | 47.5 | 64.0 | 150.0 | 11.2 | 4.5 | 100.0 | 49.5 | 9.0 | 136.0 | 73.0 | 37.5 | 107.0 | 8.3 | 3.8 | 24.0 | 24.0 | 21.1 | 91.0 | 15.9 | 9.4 |
| pH | 3.2 | 3.9 | 3.6 | 3.3 | 6.0 | 7.5 | 3.5 | 5.9 | 6.3 | 3.4 | 4.2 | 3.7 | 3.2 | 5.9 | 7.1 | 3.8 | 4.4 | 3.9 | 4.1 | 5.4 | 5.2 |
| T.O.C. (mg./l.) | 3.0 | 9.5 | 9.0 | 4.5 | 9.5 | 7.5 | 6.5 | 6.5 | 6.0 | 2.0 | 7.5 | 6.0 | 3.0 | 8.0 | 7.0 | 14.0 | 14.0 | 27.0 | | | | procedure described in Example 6. The C.O.D. of the treated solution was 2.9 mg./l. and the pH was 4.3.

EXAMPLE 11

Another synthetic tannic acid solution having a concentration of about 0.4 gm./5 gal. and a C.O.D. of 21.2 mg./l. was run through the spray reactor using the catalyst and procedure described in Example 6. The resulting C.O.D. was 11.4 mg./l. and the pH was 4.1.

EXAMPLE 33

60 gm. of commercial grade $MnO_2$ (Merck precipitated grade $MnO_2$) were washed with one liter of a 1 N $H_2SO_4$ solution and then with one liter of water. 30 gm. of the thus treated material were used as the catalyst in a Waring Blendor to treat 300 ml. of a synthetic waste phenol solution having a concentration of 9.9 mg./l. under an oxygen atmosphere for three minutes. The C.O.D. of the untreated phenol solution was 23.5 mg./l. and the pH was 8.3. The treated solution had a C.O.D. of 7.6 mg./l. and a pH of 3.5.

By contrast, when this treatment was repeated, using the same $MnO_2$, but without the acid wash, the resulting C.O.D. was 31.5 mg./l. When a blank phenol solution sample was run in the Waring Blendor, with no $MnO_2$ present, the resulting C.O.D. was 20.9 mg./l.

EXAMPLE 34

60 gm. of commercially available electrolytic grade $MnO_2$ catalyst, Lavinore "A," were washed with one liter of 1 N $H_2SO_4$, and was then washed free of $SO_4^=$ with water. 30 gm. of the thus prepared catalyst were used to treat 300 ml. of a synthetic waste water phenol solution having a concentration of 9.9 mg./l. in a Waring Blendor for three minutes under an oxygen atmosphere. The C.O.D. was reduced from 20.6 mg./l. to 7.9 mg./l.

EXAMPLE 35

Another 60 gm. of Lavinore "A" commercial $MnO_2$ were treated with one liter of 1 N $HNO_3$ solution and then washed with one liter of water. 30 g. of the thus treated catalyst was used to treat a 300 ml. sample of a phenol solution having a concentration of about 9.9 mg./l. and a C.O.D. of 22.5 mg./l. in a Waring Blendor under an oxygen atmosphere for three minutes. The thus treated solution turned yellow. Analysis showed no dissolved Mn therein, and the C.O.D. thereof was 7.8 mg./l.

When the same phenol solution was treated under the same conditions, but in the presence of another sample of Lavinore "A," which had not been acid treated, the resulting C.O.D. was 27.1 mg./l. When no $MnO_2$ was present, the resulting C.O.D. was 22.5 mg./l

EXAMPLE 36

Using a Waring Blendor under the same conditions as set forth in the previous examples, four runs were made with a phenol solution having a concentration of about 99 mg./l. and an initial C.O.D. of 30 mg./l.

In run A, 30 gm. of a Lavinore "A" $MnO_2$ which had previously been washed with 1 M $H_2SO_4$ were used in the presence of oxygen.

In run B, only the phenol solution (300 ml.) was used.

In run C, the same Lavinore "A" catalyst, but without the acid wash, was used in the presence of oxygen.

In run D, the phenol solution and oxygen were employed, but in the absence of any $MnO_2$.

The resulting C.O.D.'s were as follows:

| | Mg./l. |
|---|---|
| Run A | 0 |
| Run B | 12.9 |
| Run C | 24.1 |
| Run D | 10.5 |

EXAMPLE 37

Example 35 was repeated using a similarly treated Lavinore "C" commercial $MnO_2$ on another sample of the same phenol solution. The resulting C.O.D. was 13.6 mg./l. The treater solution was greenish yellow and had no Mn dissolved therein.

EXAMPLE 38

60 gm. of a commercial $MnO_2$ (Matheson, Coleman and Bell) were treated with one liter of a 1 N solution of $H_2SO_4$ and then washed with one liter of water. 30 gm. of the thus treated catalyst were used to treat 300 ml. of a phenol solution having a concentration of about 9.9 mg./l. and an initial C.O.D. of 23.5 mg./l. in a Waring Blendor for three minutes under an oxygen atmosphere. The resulting solution was light green and had a C.O.D. of 5.4 mg./l.

When 30 gm. of untreated $MnO_2$ from the same source was employed, the resulting C.O.D. was 29.0 mg./l. When no $MnO_2$ was present, the C.O.D. obtained upon treating the phenol solution in the Waring Blendor under the same conditions was 20.9 mg./l.

EXAMPLE 39

A 50 g. sample of $PbO_2$ (Baker Analyzed No. 2348) was washed with one liter of a 1 N $HNO_3$ solution and then with one liter of water. 30 g. of the thus obtained catalyst were then used to treat a 300 ml. sample of the phenol solution having an initial C.O.D. of 22.9 mg./l. in a waring Blendor for three minutes under an oxygen atmosphere. The resulting solution was green, had a C.O.D. of 6.3 mg./l. and a pH of 7.9.

EXAMPLE 40

A 30 g. sample of (Baker Analyzed No. 2348) $PbO_2$ was used, under the conditions set forth in Example 38, to treat 300 ml. of a phenol solution having a concentration of about 9.9 mg./l. and a C.O.D. of 22.9 mg./l. The thus treated solution had a C.O.D of 75 mg./l. and a green color.

EXAMPLE 41

Under the same conditions as set forth in Example 36, a catalyst comprising 15 mg. of the acid washed Lavinore "A" $MnO_2$ used in Example 36 and 15 mg. of untreated commercial $PbO_2$ was used to treat a phenol solution having a concentration of about 9.9 mg./l. and a C.O.D. of 30 mg./l. The resulting C.O.D. was 1.2 mg./l.

EXAMPLE 42

Using the spray reactor illustrated in FIG. 1, and operating under the conditions of Example 6, an alkyl benzene sulfonate solution having a C.O.D. of 31.6 mg./l. was treated with an $MnO_2$ catalyst prepared as described in Example 5, but with the addition of 1% by weight $AgNO_3$ based on the $Mn(NO_3)_2$. The resulting C.O.D. was 12.1 mg./l. When the oxygen blanket was replaced by air and another sample of the alkyl benzene sulfonate solution treated in the reactor, all other conditions being unaltered, the resulting C.O.D. was 15.1 mg./l. Similar results are obtained with the catalyst of Example 5.

EXAMPLES 43–46

Using 20 gm. of the catalyst prepared in Example 5 four samples of urine that was collected and pooled from five male subjects were treated in the low-pressure distillation apparatus illustrated in FIG. 3. The test conditions and results are set forth in Table 2. When a sample of the urine was run through the same reactor which contained glass wool rather than the supported catalyst of Example 5, employing an evaporator temperature of 150° F. and a reactor temperature of 300° F., the resulting C.O.D. was 577 mg./l.

EXAMPLES 47–48

Proceeding as in Examples 43–46, an aqueous ammonia solution having a concentration providing 3800 p.p.m. of ammonia in the vapor at 100° F. was run through the reactor under the conditions set forth in Table 2. As shown in Table 2, the distillate contained only 10.5 to 12 mg./l. of $NH_3$ (as N) when the catalyst temperature was maintained at 295–300° F. and the ratio of $O_2$ to processed water was 0.013–0.015. This amount of oxygen is 40–64 percent in excess of stoichiometric, assuming the $NH_3$ is oxidized to NO. A total of 7,150 ml. of urine and 970 ml. of ammonia water were processed through the same 20 gm. of catalyst without any decrease in catalytic activity.

EXAMPLES 49-50

20 gm. of the catalyst prepared in Example 5 and the air evaporation distillation apparatus illustrated in FIG. 4 were employed to treat urine in two runs under the operating conditions and with the results set forth in Table 3.

The relatively low average rate of recovery was due to the limitation of the 600 cubic inch per hour diaphragm pump employed in the experimental apparatus.

TABLE 2.—LOW PRESSURE DISTILLATION

| | Operating Conditions | | | | | | | | | Performance | | | | | |
|---|---|---|---|---|---|---|---|---|---|---|---|---|---|---|---|
| | Avg. Temperature of— | | | Avg. Pressure, mm. HgA | | Avg. $O_2$ input | | | Volume of $H_2O$ Reclaim, ml. | Oper. Time, Hrs. | Avg. Rate of Recov., ml./hr. | Quality of Recov. $H_2O$ | | | |
| Example No. | Evap., °F. | Catalyst, °F. | Cond., °F. | Evap. | Cond. | Comp., percent | Press., mm./HgA | Flow Rate, ft.³/hr. | | | | C.O.D., mg./l. | pH | Color, cl./pt. | Odor | $NH_3/N$, mg./l. | Spec. cond., mho/cm. |

| | | | | | | | | | | | | | | | | | |
|---|---|---|---|---|---|---|---|---|---|---|---|---|---|---|---|---|---|
| | | | | | | | | | Low Pressure Distillation—Urine | | | | | | | | |
| 43 | 80 | 290 | 60 | 30 | 20 | Air | 760 | .06 | 750 | 4 | 187 | 16 | 8.0 | <10 | Neg | NR | 33.5 |
| 44 | 95 | 290 | 80 | 66 | 31 | Air | 760 | 0.6 | 1,110 | 5 | 220 | 0 | 8.4 | <10 | Neg | 2.0 | 55 |
| 45 | 102 | 300 | 81 | 65 | 33 | Air | 760 | .05 | 490 | 2.5 | 196 | 18 | 7.8 | <10 | Neg | 0.75 | NR |
| 46 | 104 | 295 | 85 | 70 | 35 | Air | 760 | .06 | 800 | 4 | 200 | 7 | 8.3 | <10 | Neg | 1.0 | NR |
| | | | | | | | | Ammonia Tests Using 3,800 p.p.m. $NH_3$ Solution | | | | | | | | | |
| 47 | 100 | 295 | 90 | 78 | 42 | Air | 760 | .36 | 370 | 1.7 | 218 | | | | | 12 | |
| 48 | 100 | 300 | 90 | 79 | 47 | Air | 760 | .38 | 600 | 3 | 200 | | | | | 10.5 | |

TABLE 3.—AIR EVAPORATION DISTILLATION

| | Operating Conditions | | | | | | | Performance | | | | |
|---|---|---|---|---|---|---|---|---|---|---|---|---|
| | Avg. Temperature of— | | | Recirc. Air | | Volume of $H_2O$ Reclaimed, ml. | Oper. Time, hrs. | Avg. Rate of Recov., ml./hr. | Quality of Recov. $H_2O$ | | | |
| Example No. | Evap., °F. | Catalyst, °F. | Cond., °F. | Press., mm. HgA | Flow Rate, c.f.h. | | | | C.O.D., mg./l. | pH | Color, cl./pt. | Odor | $NH_3/N$, mg./l. |
| 49 | 99 | 100 | 35 | 760 | 13.5 | 65 | 5.7 | 11.4 | 14 | 3.6 | <10 | Neg | 2 |
| 50 | 82 | 84 | 35 | 760 | 12.5 | 55 | 7 | 7.8 | 19 | 3.5 | <10 | Neg | NR |

While I have herein shown and described several forms of the present invention and have suggested various modifications therein, other changes and modifications may be made therein without departing from the spirit and scope of this invention.

Having thus described my invention, what I desire to secure and hereby claim by Letters Patent is:

1. A method of purifying waste water containing oxidizable pollutants therein comprising maintaining said waste water in the vapor phase and intimately admixing, at a temperature of at least about 32° F., said waste water vapor with an oxygen-containing gas and a catalyst of manganese dioxide which has been treated, at a pH not in excess of about 4, with an acid or with an acid salt which hydrolizes in water to an acid pH, to thereby effect oxidation of said pollutants.

2. The method of claim 1 wherein said waste water is domestic sewage or is industrial waste and said pollutants are organic at least in part.

3. The method of claim 1 wherein the purified waste has a chemical oxygen demand no greater than about 50% that of the unpurified waste.

4. The method of claim 1 wherein said acid treatment is at a pH not in excess of about 3.

5. The method of claim 1 wherein said oxidation is effected at a pressure not in excess of atmospheric.

6. In a method of purifying waste water, the improvement which comprises, in sequence, the steps of
   (1) subjecting said waste water to the catalytic oxidation process of claim 1, and thereafter
   (2) subjecting the thus treated water to the bio-degrading action of bacteria.

7. The method of claim 1 wherein said temperature is in the range of from about 90 to 350° F.

8. The method of claim 1 wherein said temperature is in the range of from about 100 to 300° F.

9. The method of claim 5 wherein said pressure is less than atmospheric.

10. The method of claim 2 wherein said waste water comprises urine.

References Cited

UNITED STATES PATENTS

| | | | |
|---|---|---|---|
| 1,602,404 | 10/1926 | Frazer | 252—471 |
| 2,132,592 | 10/1938 | Wells et al. | 210—50 X |
| 2,468,865 | 5/1949 | Campobasso et al. | 210—63 X |
| 2,690,425 | 9/1954 | Moses et al. | 210—63 X |
| 3,054,653 | 9/1962 | Barton et al. | 210—63 X |
| 3,133,016 | 5/1964 | Stine et al. | 210—63 X |
| 3,142,638 | 7/1964 | Blaisdell et al. | 210—53 X |
| 3,222,277 | 12/1965 | Joyce | 210—63 |
| 3,337,452 | 8/1967 | Teske et al. | 210—45 |
| 3,127,243 | 3/1964 | Konikoff | 210—63 X |

FOREIGN PATENTS 596,536  4/1960  Canada.

MICHAEL E. ROGERS, Primary Examiner

U.S. Cl. X.R.

23—2; 203—10, 31, 34; 210—63; 252—413, 471

PO-1050
(5/69)

UNITED STATES PATENT OFFICE
CERTIFICATE OF CORRECTION

Patent No. 3,487,016          Dated December 30, 1969

Inventor(s) JACK D. ZEFF

It is certified that error appears in the above-identified patent and that said Letters Patent are hereby corrected as shown below:

Column 3, line 66, "NaBr$_3$" should read -- NaBrO$_3$ --. Column 4, line 74, "waste vapor air" should read -- waste water vapor are --. Column 5, line 45, "waster" should read -- waste --. Column 6, lines 54 and 55 should read -- were treated in the spray reactor. This secondary effluent had already been subjected to an activated sludge sewage --; line 71 "173" should read -- 17.3 --. Columns 7 and 8, Table 1, Example No. 22, "13.5 mg./l." should read -- 13.5µl./l. --. Column 9, line 42, after "22.5 mg./l" insert a _period_ (.); line 47, "99" should read -- 9.9 --; line 68, "treater" should read -- treated Column 10, line 17, "waring" should read -- Waring --; line 27, "75" should read -- 7.5 --; line 51, after "Example 5" insert a _comma_ (,). Columns 11 and 12, Table 2, Example No. 44, under the heading "Avg. Rate of Recov., ml./hr." change "220" to -- 222 --.

SIGNED AND
SEALED
AUG 18 1970

(SEAL)
Attest:

Edward M. Fletcher, Jr.
Attesting Officer

WILLIAM E. SCHUYLER, JR.
Commissioner of Patents